(No Model.)

S. A. DONNELLY.
CYCLE WHEEL.

No. 531,914.    Patented Jan. 1, 1895.

WITNESSES:
Fred G. Dieterich
Edw. W. Byrn.

INVENTOR
Samuel A. Donnelly
BY Munn & Co.
ATTORNEYS.

UNITED STATES PATENT OFFICE.

SAMUEL A. DONNELLY, OF CHICAGO, ILLINOIS, ASSIGNOR OF ONE-HALF TO PETER DEWARD, OF SAME PLACE.

CYCLE-WHEEL.

SPECIFICATION forming part of Letters Patent No. 531,914, dated January 1, 1895.

Application filed September 15, 1894. Serial No. 523,106. (No model.)

*To all whom it may concern:*

Be it known that I, SAMUEL A. DONNELLY, of Chicago, in the county of Cook and State of Illinois, have invented a new and useful Improvement in Cycle-Wheels, of which the following is a specification.

My invention is designed to provide a simple, strong, and easily constructed cycle wheel, and to that end it consists chiefly in the improved construction of the hub, which I will now proceed to describe with reference to the drawings, in which—

Figure 1:
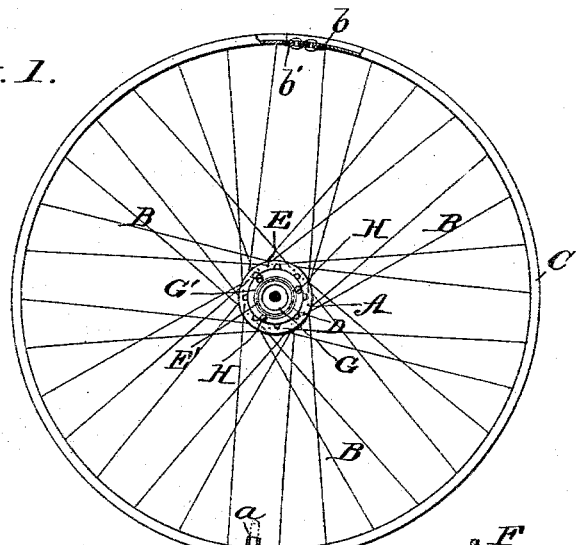
Figure 2:
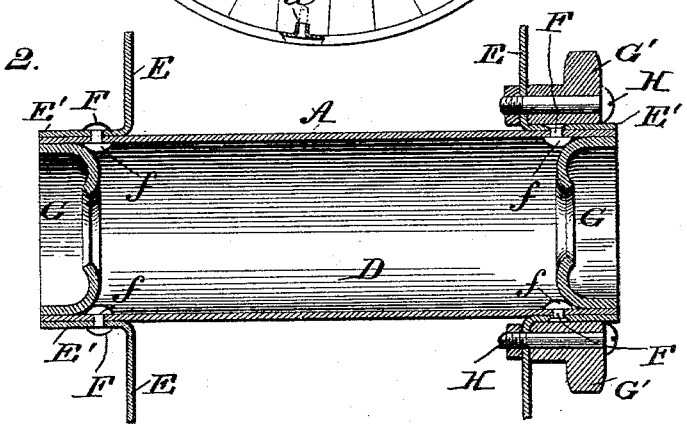

Figure 1 is a side view; Fig. 2, an enlarged central longitudinal section of the rear hub, and Fig. 3 a similar view of the front hub, showing a slight modification.

In the drawings, A represents the hub, B the spokes, and C the rim for the pneumatic tire. This rim has upon one side an inwardly protruding nipple $a$ or opening for the pneumatic tire valve stem, and upon the diametrically opposite side has the lap joint $b\ b'$, this joint being exactly opposite the tire valve for the purpose of balancing the weight of the valve stem at $a$. In this lap joint one of the ends $b$ preserves the curve of a true circle, while only the other end $b'$, which is riveted to it, is bent inwardly so as to keep the outer periphery of the rim a true circle.

Referring to Fig. 2, D is the tube or body portion of the hub. To each outer end of the tube is riveted the flange E E', the part E standing at about right angles to the tube D and connecting with the spokes B, while the part E' embraces and closely fits and reinforces the end of the tube D where it receives the ball bearing case G. This part E' of the flange is firmly secured by rivets F to the tube, and the inner ends of these rivets are headed at $f$ and allowed to project to form a backing or series of stops against which rest the inner faces of the ball bearing cases G, which rivet heads form a support for and limit, in a cheap and practical way, the distance to which the ball bearing cases may be inserted into the ends of the tube.

G' is the sprocket wheel which receives the driving chain. This is secured to one of the flanges E and embraces the collar section E', and is firmly held to place by bolts H passing through flange E and having nuts upon their inner ends.

Figure 3:
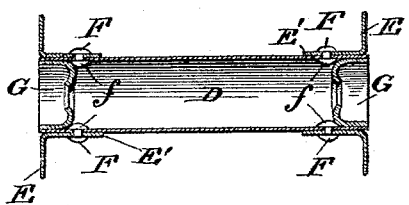

As shown in Fig. 2, the flange sections E set in a short distance from the outer end of the tube, while the collar sections E' extend out to the ends thereof; but these parts may just as well be reversed, as shown in Fig. 3, in which the flange sections E are out flush with the outer ends of the tube D, and the collar sections E' are turned inwardly. This construction of hub gives a double thickness outside of the ball bearing case, thus reinforcing and strengthening that part of the wheel upon which the weight and strain come, while the rivets F with projecting heads $f$ serve the double purpose of fastening the flanges to the tube, and also acting as back stops to the ball bearing cases.

Having thus described my invention, what I claim, and desire to secure by Letters Patent, is—

1. The combination with the tube or body portion of the hub; of the spoke flanges having one portion projecting from the hub and the other portion closely fitting and embracing the ends of the tube as a collar, rivets securing this collar portion of the flanges to the end of the tube and having an inward projection, and the ball bearing cases arranged within the double or reinforced portion of the hub and bearing against the projections of the rivets substantially as and for the purposes described.

2. The combination with the tubular body of the hub; of the flange E E' having its projecting part E turned in, and its part E' extending to the outer end of the tube and riveted to it, and a sprocket wheel G bolted to the projecting part E of the flange and embracing its collar section E' substantially as and for the purpose described.

SAMUEL A. DONNELLY.

Witnesses:
MORRIS L. KOCH,
JOSEPH DONNELLY.